(12) United States Patent
Boll

(10) Patent No.: US 11,867,315 B2
(45) Date of Patent: Jan. 9, 2024

(54) METHOD FOR VERIFYING THE OPERABILITY OF A SAFETY VALVE

(71) Applicant: SAMSON AKTIENGESELLSCHAFT, Frankfurt am Main (DE)

(72) Inventor: Tobias Boll, Frankfurt am Main (DE)

(73) Assignee: SAMSON AKTIENGESELLSCHAFT, Frankfurt am Main (DE)

( * ) Notice: Subject to any disclaimer, the term of this patent is extended or adjusted under 35 U.S.C. 154(b) by 248 days.

(21) Appl. No.: 17/190,742

(22) Filed: Mar. 3, 2021

(65) Prior Publication Data

US 2021/0278013 A1    Sep. 9, 2021

(30) Foreign Application Priority Data

Mar. 3, 2020 (DE) .......................... 102020105695

(51) Int. Cl.
*F16K 37/00* (2006.01)
*G01M 13/003* (2019.01)

(52) U.S. Cl.
CPC ...... *F16K 37/0083* (2013.01); *F16K 37/0091* (2013.01); *F16K 37/0041* (2013.01); *G01M 13/003* (2019.01)

(58) Field of Classification Search
CPC .................................................. F16K 37/0083
USPC ........................................................ 73/1.72
See application file for complete search history.

(56) References Cited

U.S. PATENT DOCUMENTS

2017/0335992 A1*  11/2017  Daraiseh .................. F16K 31/06
2018/0112798 A1*   4/2018  Junk ...................... F15B 19/005

FOREIGN PATENT DOCUMENTS

| DE | 197 23 650 A1 | 12/1998 |
| DE | 10 2005 004 477 A1 | 8/2006 |
| DE | 10 2011 052 901 A1 | 2/2013 |
| DE | 10 2016 222 153 A1 | 5/2018 |
| DE | 10 2018 103 324 B3 | 4/2019 |
| EP | 1 500 857 A1 | 1/2005 |
| WO | 2009/013 205 A1 | 1/2009 |

OTHER PUBLICATIONS

European Application No. EP21160258, Search Report, dated Aug. 9, 2021.
DE 10 2020 105 695, Search Report dated Nov. 30, 2020.

* cited by examiner

*Primary Examiner* — Walter L Lindsay, Jr.
*Assistant Examiner* — Philip T Fadul
(74) *Attorney, Agent, or Firm* — GrowIP Law Group LLC

(57) ABSTRACT

A method for verifying the operation of a safety valve having a valve member and a positioner for controlling the position of the valve member is proposed. The safety valve is part of a plant on which a process with a process medium runs. The plant has a sensor for monitoring the state of the plant, the process and the process medium. A sensor's measured value is used to determine a point in time during ongoing plant operation at which the operability of the valve can be verified in the context of a partial stroke test. The test can also be monitored with the sensor and the stroke range traversed therein can be dynamically adapted to the state. The test can thus be performed safely during operation and with an optimized stroke range. The method enables more frequent testing of and more reliable statements about the operability of the safety valve.

17 Claims, 8 Drawing Sheets

METHOD FOR VERIFYING THE OPERABILITY OF A SAFETY VALVE

CROSS-REFERENCE TO RELATED APPLICATION

This application claims the benefit of the filing date of German Application No. DE 102020105695, filed on Mar. 3, 2020, the contents of which are hereby incorporated by reference in their entirety.

FIELD OF THE INVENTION

Control valves or fittings consist of an actuator and a movable valve member. They are used to regulate a fluid flow. The actuator stem of the valve member is usually guided to the outside by a fluid-tight housing or cover of the valve. A seal (e.g. packing) seals the actuator stem from the outside of the valve housing cover. Outside is an actuator, which acts on the actuator stem and moves the valve member. Typically, fluidic actuators (usually pneumatic) are used to move the actuator stem. The type of valves can be either rotary valves or globe valves.

When moving the valve member by means of the actuator, various forms of static and sliding friction occur. The causes of friction can be:
- the seal between the actuator stem and the valve body cover,
- friction between the actuator stem and the actuator housing seal,
- in the case of rotary valves: Friction of the rotary element against the sealing lips,
- for globe valves: Friction of e.g. the sliding gate on the seal lips,
- incrustations due to corrosion or particles in the fluid.

On/off control valves tend to stick if the valve member remains or is held in one position for a long time. The increased static friction then often demands great forces from the actuator. With pneumatic actuators, a correspondingly higher pressure is required to tear or break loose the valve member against the static friction. In the stroke-pressure curve of the valve, an enhanced increase or decrease in pressure can be seen until a change in travel can be detected.

Single-acting pneumatic actuators are generally used in the area of safety-relevant valves and safety relief valves. The actuators, which are preloaded on one side by spring forces, move independently to a safe position or fail-safe position when the actuator is vented, i.e. when the compressed air escapes from the chamber of the actuator. This happens, for example, when a current-pressure (I/P) transducer or a solenoid valve is no longer energized.

In the case of safety valves, the valve is often open during normal operation, and in the event of a fault (e.g. power failure), the valve closes automatically. The compressed air always acts against the spring force with which the actuator was preloaded. If the actuator is vented, the valve starts to close as soon as the spring forces have loosened the valve member against the static friction that may be present.

The safety position can, of course, also be de-energized open (actuator vented) and energized closed (actuator vented).

BACKGROUND

In order to ensure the safe operation of a safety valve or a safety fitting, in many cases it is tested after a certain time (e.g. cyclically or at fixed time intervals) whether the valve or actuator can be fully moved into the safety position. Such a full stroke test proves the full operability of a safety valve. However, in many cases it requires an interruption of the running operation of a plant and is usually associated with high effort and costs.

In order to be able to verify the operability of a safety valve during operation without interrupting the work processes, the so-called partial stroke test (PST) was developed (see, for example, the disclosure documents DE 19723650 A1 or WO 2009/013205 A1 or the patent specification DE 102018103324 B3). In this case, the actuator is moved only to the extent that the actuator travels part of the distance to the safety position (a closed or open position, depending on the application) without significantly influencing or disturbing the process of the plant.

The typical course of a partial stroke test can be understood from FIG. 1. There, the relative stroke of the valve member and the pressure over time are shown during a partial stroke test on a safety valve. The safety valve has a single-acting pneumatic actuator with spring return. The safety position is closed de-energized. The setpoint 110 shows the ideal frictionless stroke characteristic when the valve closes during uniform venting. The pressure is reduced and the spring forces of the actuator are released and move the valve member towards the closed position. The actual pressure curve 120 initially shows a clear reduction in pressure before the stroke (actual stroke) 130 changes. This shows the valve member breaking away from its open position, in which it may already have been stuck, i.e. subject to static friction. The difference between the initial maximum pressure and the pressure at the moment of breakaway is called the breakaway pressure 140. The breakaway pressure is the pressure or force sufficient to overcome static friction and release the valve. The pressure in the actuator fluid at the moment of breakaway remains as a reserve 150, provided it is greater than 0 bar. If not, the safety valve can no longer fulfill its function. The pressure is readjusted after breakaway, i.e. increased again, so that overshooting is avoided or reduced. After the static friction has been overcome and the stroke movement accelerated, the actuator is vented uniformly (slow pressure reduction) until 90% of the stroke is reached. The actual stroke curve 130 runs approximately linear in the range of the sliding friction and parallel to the target stroke curve 110, shifted parallel by the amount of the sliding friction. After reaching 90%, the pressure in the actuator is increased again so that the valve member again opens fully against the spring forces. The partial stroke test is completed.

Eliminating the time and plotting the pressure 120 against the stroke 130 produces the stroke-pressure curve of FIG. 2. The closing pressure reserve 220 is the pressure reserve that remains after the safety valve is closed. The closing pressure reserve 220, which occurs with constant movement (sliding friction), can be determined from FIG. 2. For this purpose, the strokepressure curve according to FIG. 2 is extrapolated further to the closed position (stroke=0).

Partial stroke tests can be performed during operation. They allow conclusions to be drawn about the basic movability of the valve member, at least within the scope of the executed stroke movement of the valve member. However, they must be designed in such a way that they do not significantly interfere with ongoing operation under any circumstances. In addition, the informative value is limited by the stroke travel executed. Partial stroke tests are therefore not a complete substitute for full stroke tests, so that it may still be necessary to interrupt ongoing operation at certain intervals to verify the full operability of safety valves.

Partial stroke tests also involve the risk of overshooting beyond the stroke range intended for a partial stroke test due to the static friction that usually occurs initially as a result of incrustation or corrosion of the valve member. To avoid such overshooting and the associated negative influences on the ongoing operation of a plant, the pressure of the compressed air in a pneumatically operated safety valve can be increased again after the valve member has been torn loose or broken loose. Uniform further movement in the direction of the safety position is achieved if the pressure of the compressed air is then reduced again in a controlled manner, i.e. the actuator is slowly vented. After the actuator has been moved part of the way towards the safety position, it is returned to the starting position. Such a procedure is described in the disclosure document DE 102011052901 A1. Other procedures for preventing overshooting of the valve member during a partial stroke test can be found, for example, in the disclosure document DE 102005004477 A1, in which a mechanical stop is used, and EP 1500857 A1, which provides an electronic stop for these purposes.

Partial stroke test procedures or partial stroke tests are usually carried out within a relatively small stroke range, comprising about 5 to 15% of the stroke path towards the safety position, depending on the users specifications. This is usually sufficient to prove the basic mobility of the valve member and to rule out the most common malfunctions of a safety valve. However, it is disadvantageous that no statement can be made as to whether the actuator would continue to move to the safe position with the remaining spring force or the pressure force of the compressed air in the actuator. For this purpose, DE 102018103324 B3 suggests recording a stroke-pressure curve during a partial stroke test. The stroke-pressure curve can be used, for example, to determine the pressure reserve of an actuator, which provides information on whether the valve would close reliably in case of a safety event.

The reliability of such conclusions is limited by the stroke distance actually traveled. Obstacles on the part of the travel to the safety position that has not been travelled are usually not taken into account. Operators of plants with safety valves must therefore continue to check the full operability of the safety valves at least at certain intervals in the course of full stroke tests.

Partial stroke tests can be performed either manually or automatically, i.e. on a time basis. Manual partial stroke tests can be performed during a shutdown, but also during a running process. Although the partial stroke tests are set in such a way that they do not or only slightly disturb a running process, there is always the risk that the partial stroke test is started at a critical stage or condition of the process or the plant. Therefore, a decision must always be made depending on the specific situation. Manual partial stroke tests are therefore not carried out if there is doubt or no absolute certainty that the plant is not in such a critical stage or state. The same applies to automated partial stroke tests. These usually have to be monitored and manually aborted in situations that appear unfavorable, often before any significant stroke has been achieved.

SUMMARY

Problem

The purpose of the invention is to enable safer and more reliable verification of the operability of a safety valve and to improve the information about the operability of a safety valve that can be derived from the testing.

Solution

This problem is solved by the subject of the independent claim. Advantageous developments of the subject of the independent claim are characterized in the dependent claims. The wording of all claims is hereby incorporated in the content of this description by reference.

The use of the singular shall not exclude the plural, which shall also apply in the reverse sense, unless the contrary is disclosed.

Individual method steps will be described in greater detail hereinafter. The steps do not necessarily have to be performed in the specified order, and the method to be described can also comprise further steps which are not mentioned.

In order to solve the problem, a method for verifying the operability of a safety valve is proposed, whereby the safety valve has a valve member and a positioner for controlling the position of the valve member. The safety valve is part of a plant on which a process with a process medium runs or can run. The plant comprises at least one sensor for monitoring the state or a property of the plant and/or the process and/or the process medium. The method further comprises a first and a second partial stroke test for checking the operability of the safety valve, wherein for the first partial stroke test a first stroke of the valve member is predetermined by the positioner. The method also comprises the following steps:

a) At least one measured value of at least one of the sensors is recorded.

b) Based on at least one of the measured values, a point in time during the running process is determined at which the second partial stroke test may be carried out, the second partial stroke test having a second stroke of the valve member by the positioner which is greater than the predetermined first stroke of the first partial stroke test and less than or equal to the stroke in a full stroke test. Further, the second stroke is such that the second partial stroke test can disrupt the process to no more than an intended or predetermined extent.

c) The second partial stroke test is performed at the time previously determined.

The method is suitable both for safety applications of a safety valve with on/off operation and for control applications with corresponding control valves, in particular if the valve member has been held in one position for a long time, i.e. the valve member has not been moved for a long time. The term safety valve is to be understood correspondingly broadly in the context of this application. The same applies to the positioner, which may be, for example, a fluidically or electrically driven positioner.

The partial stroke test or PST is performed with the aid of the positioner, which moves the valve member for this purpose. The movement of the valve member by the positioner is generally referred to as stroke. A stroke usually occurs in the direction of the spring forces with which the actuator of the safety valve is preloaded. The positioner can raise or lower the valve member for this purpose, depending on the application. A stroke can also represent a rotational movement of a valve member, such as in a butterfly valve or ball valve, or a thrust movement of a valve member or slider in a gate valve.

To control the position of the valve member or to be able to move the valve member in a controlled manner, the positioner may have a sensor or be coupled to a sensor that allows conclusions to be drawn about the position of the valve member. The latter can be, for example, a pressure sensor in a fluidic actuator, which the positioner controls to move the valve member, or a system consisting of a magnetic sensor and a magnetic coding strip or pole ring. The sensor of the positioner, as well as the at least one sensor of the plant, can be used to track how the state or property of the plant and/or process and/or process fluid changes with the position of the valve member. This shows, among other things, or it is clear to the person skilled in the art that the position of the valve member of the valve whose operability is to be verified is not suitable for determining the point in time for carrying out the second partial stroke test.

The first partial stroke test of the proposed method represents a partial stroke test according to the state of the art. It is configured in such a way that it does not significantly influence or disturb the ongoing operation of the plant or the ongoing process, at best independent of the state of the plant.

In order to overcome the limitations of such partial stroke tests or partial stroke test procedures outlined above, in particular the limited stroke and the restricted starting conditions, which are often dependent on individual decisions, the proposed method offers the possibility of performing the second partial stroke test with a larger stroke. However, this requires that a point in time be determined when this larger stroke will not interfere with the operation of the plant beyond the specified extent. For this purpose, the plant, the process and/or the process medium is observed with at least one sensor in order to identify a point in time at which the second partial stroke test can be carried out with a larger stroke. In the best of all cases, this second partial stroke test can even be performed with a full movement, for example, when the process medium in the plant is not flowing at a certain time.

The proposed method thus makes it possible to perform the second partial stroke test with a larger range of movement or stroke of the valve member than in the first partial stroke test, up to a full stroke test. This allows more reliable statements to be made about the operability of the valve or safety valve. In addition, incrustations can be detected or avoided along a larger stroke range than in the first partial stroke test.

With the aid of the second partial stroke test, consideration can be given to the ongoing operation of the plant and associated processes. In contrast to the first partial stroke test, in which the stroke of the valve member is fixed, the stroke that is executed in the second partial stroke test can be configured or selected in such a way that the property of the process medium, process and/or plant associated with the measured value for determining the point in time at which the second partial stroke test can be carried out or a corresponding condition can change at most to an intended or predetermined extent, e.g. does not exceed or fall below a maximum and/or minimum value. Accordingly, the stroke range can be adapted to the running process.

The disturbance of the process by the partial stroke test need not be to the extent specified for determining the point in time at which the second partial stroke test can be performed. The actual disturbance of the process by the second partial stroke test usually assumes a smaller magnitude. On the one hand, this is due to safety distances or buffers that may be included in the predetermined extent or the stroke range of the second partial stroke test. On the other hand, the predetermined extent is usually determined based on a permanent disturbance of the process. However, many processes, at least in certain states or stages, respond to a localized disturbance such as a partial stroke test with some delay or latency. In these cases, the test may be completed before it even disturbs the process. As a rule, the disturbance of the process due to its inertia or latency is less than the permanent disturbance used to determine the predetermined extent.

The point in time for the second partial stroke test is determined based on information about the current process. It is determined such that the valve member can be moved by the positioner in a larger stroke range than during the first partial stroke test. This is the case, for example, when the plant is at a standstill, but also includes less obvious situations, e.g., situations in which the level of a reservoir, tank, or line permits brief closure or at least partial closure of the supply line to the reservoir or tank or line. Such situations occur, for example, in batch or charge processes. Further applications are district heating systems or solar thermal systems, where the temperature of the heat transfer medium in feed and discharge lines of heat consumers is monitored by means of sensors. If the measured temperatures suggest that the heat supply may be interrupted or at least restricted for a short time, the second partial stroke test can usually be carried out according to the proposed procedure. Similar considerations apply to the oxygen supply for a blast furnace, where temperature measurements allow similar conclusions to be drawn, or to chemical plants where the composition, density, or pH of a process medium or product indicates that a supply line is available for the second partial stroke test for at least a certain amount of time.

The first partial stroke test is not necessarily performed first. It can be performed before or after the second partial stroke test. In addition, the second partial stroke test can be performed repeatedly, each time with a stroke adapted to the situation. In addition, by taking process-relevant variables into account, a partial stroke test can generally be performed more frequently. The valve element is thus moved and traversed more frequently. Incrustations, corrosion and the associated friction or frictional forces can thus be reduced or avoided, which improves the availability and operability of the safety valve or the system or reduces the probability of failure. In addition, maintenance intervals can be extended.

To avoid unnecessary tests or the associated load on the running operation or the safety valve, a minimum period between two partial stroke tests or a maximum frequency for the partial stroke tests can be specified. The second partial stroke test is therefore only repeated after an appropriate period of time has elapsed and a test is again reasonable.

The proposed method is a middle course between manual and time-based (cyclic) execution of partial stroke tests. On the one hand, it is automated, but on the other hand, it is only carried out in situations that allow the execution of a partial stroke test. This means that verifying the operability of a safety valve no longer depends on individual decisions or an individual assessment of the situation at hand. In addition, dangerous situations, which could result from the execution of a partial stroke test in critical states of the process or the plant, can be avoided.

The second partial stroke test may differ from the first partial stroke test not only by the stroke range that is traversed. Typically, however, the second partial stroke test is performed with the same parameters or under the same general conditions as the first partial stroke test. For example, the second partial stroke test may include the same measures to prevent overshoot of the valve member as the first partial stroke test. By using the same parameters or framework conditions (apart from the length of the stroke path or the size of the stroke range traversed), the test results of the first and second partial stroke tests can be compared. In addition, the configuration of the safety valve or the positioner is simplified.

The parameters or framework conditions are configuration and abort settings of the PST that describe hard limits within which the PST is allowed to move. They consist of predefined settings (e.g. the parameters of a first partial stroke test) and process value dependent settings (e.g. the stroke range within the scope of the second partial stroke test). These settings are always taken into account, so that even tests performed at different times provide comparable results. The difference is usually in the traversed stroke range. However, the stroke range of the second partial stroke test may also be fixed for better comparability of the tests.

The parameters of a partial stroke test comprise, for example, the position or stroke of the valve member at the start of the PST (e.g., the stroke in the end position of the valve member) or the maximum stroke of the valve member that should be reached during a PST and, as a rule, must not be exceeded. In addition, the way in which the stroke range is traversed can be set. The stroke change in the course of a partial stroke test can take place in the form of a jump or a so-called ramp from an initial position of the valve member (in many cases an end position) to the maximum stroke of the valve member envisaged in the course of the test. Therein, a jump occurs within one second, while a ramp represents a linear progression of the stroke of the valve member, in which the intended or specified maximum stroke is reached in more than one second (up to 9999s, for example). The corresponding speed or the corresponding time interval is variably adjustable or can also be preset. In addition to parameters for the stroke or the position of the valve member, similar parameters can be specified for the pressure of the fluid with which the positioner is driven. The frequency with which partial stroke tests are carried out or the time between two tests can also be specified or set.

Further parameters can be set during the second partial stroke test. These include the minimum stroke, which is always specified by the stroke during the first partial stroke test. During the second partial stroke test, the valve member must be moved by at least the minimum stroke. If this cannot be fulfilled, the test does not even start or, if the test has already been started and aborted prematurely, is not considered to have been carried out successfully. A test with less movement does not provide any information about the condition of the actuator or the safety valve. Further parameters or general conditions comprise the condition or at least one property of the plant, the process and/or process medium. For example, flow-, temperature- or pressure-dependent settings can be made. For example, a high temperature or pressure of the process medium may indicate a critical stage of the process. A PST will not be performed in this case, although, for example, the currently measured flow value would allow a PST.

In addition to the configuration settings, abort criteria can also be defined, e.g. to safeguard against unforeseeable events or malfunctions. Such abort criteria can be the maximum test duration after which a test is aborted in any case, the dead time after which the test is aborted if the valve member cannot be moved, or lower or upper bounds or tolerance values or bands for the position of the valve member and/or the pressure of the fluid with which the positioner is driven.

The second stroke can adopt any value in the range between the first stroke and the maximum stroke defined by the maximum disturbance of the process. Usually, the maximum available stroke range is used, i.e. the second stroke is configured in such a way that the second partial stroke test can disturb the process to the predetermined extent. In this way, the informative value of the second partial stroke test can be optimized.

By utilizing the available stroke range, it is ideally even possible to perform a full stroke during the second partial stroke test or to run through the complete stroke range up to the safety position without having to shut down the plant. In this way, plant shutdowns can be avoided. In addition, full stroke tests can in many cases be carried out more frequently, thus ensuring a higher degree of plant safety. If full stroke tests are not available, or at least not for a longer period of time, the method allows a larger stroke range to be run through or tested, at least as a rule. This can eliminate the need for a full stroke test in many cases. At the very least, the time periods in which a full stroke test does not have to be performed can be extended.

The maximum stroke range can be calculated, for example, from the current flow rate $D_0$ of a process medium through a line with the valve fully open (stroke h=0) and a safety margin of x (x can be, for example, 1%, 2%, 3%, 5% or 10%) relative to a predetermined value of the flow rate $D_{min}$ that must be maintained. In some cases, the flow rate D is almost proportional to the stroke h. In such cases, the maximum available stroke $h_{max}$ for the second partial stroke test is $$h_{max}=1-(D_{min}/D_0)(1+x),$$

where $h_{max}=1$ corresponds to a full stroke (in this example: complete closing of the valve). The correlation is only valid for $(1+x) D_{min} \leq D_0$. In many cases, there is no such linear and/or unambiguous correlation, but this can usually be compensated for by choosing a sufficiently large safety distance x. Other characteristics or conditions of the plant, process or process medium can similarly be used to determine the timing of the second partial stroke test.

With the help of such or similar considerations, it is possible to determine times at which the executable stroke $h_{max}$ is greater than the stroke, for example 10%, typically selected for a classical partial stroke test. If a maximum stroke $h_{max}$ is found that is greater than the specified first, classical stroke in the first partial stroke test, a point in time has been found when the second partial stroke test can be performed. In the present example, the measured value that is acquired to determine a suitable time for the second partial stroke test would be the flow rate $D_0$. If the current flow rate is sufficiently above the minimum flow rate to be maintained, a second partial stroke test can be performed with a larger stroke.

Based on such conclusions, modeling or considerations, the second partial stroke test can automatically be performed in the optimum range within defined framework conditions (see above). The optimum range is defined by several criteria:

1. The valve performs as large a stroke as possible so that, if possible, the complete stroke range can be checked for correct functioning.
2. The process is disturbed only slightly or not at all, wherein a slight disturbance is permitted at least within the scope that also applies to a classically set partial stroke test, i.e. for a first partial stroke test.
3. The general conditions are observed.

With the considerations or calculations outlined above, the effect of the second partial stroke test on the running process can be predicted or estimated. In many cases, a partial stroke test can be carried out on the basis of such considerations without further measures. This is especially true for cases and applications where the characteristics or state of the plant, process, or process medium change on time scales which are significantly larger than the time scale for performing the second partial stroke test. However, these scales may change during operation. In many cases, the inlet or inlet line of a filled accumulator or tank may be closed for the duration of the second partial stroke test, whereas this is not the case for an accumulator or tank that is currently running empty or has run empty. The same applies to the first partial stroke test, which, although designed to not significantly disrupt or influence the ongoing process, can still lead to unforeseen disturbances in unfavorable situations. In many cases, therefore, it is useful to use at least one of the sensors to monitor whether the process is being disrupted to no more than the intended or predetermined extent when performing the first or second partial stroke test. If this is not the case, the test can be aborted automatically or manually (due to an error message from the system). This not only increases the safety of the plant or process when performing the test. It also allows the first or second partial stroke test to be performed in less clear-cut initial situations. This usually allows the tests to be performed more frequently.

Coupling process measurement values to a partial stroke test with variable stroke also makes it possible to determine the optimum or maximum possible stroke during test execution. The stroke range of the second partial stroke test can be dynamically adapted to the running process with the aid of the sensor system in order to be able to traverse the largest possible stroke range. In this way, models and estimates regarding the effect of the second partial stroke test on the process medium, the process or the plant are only used to determine the time of execution. The actual execution of the test may even be independent of models and estimates. Errors due to simplistic considerations (such as the assumption of a linear relationship or direct proportionality) or due to unknown or unrecognized disturbing influences can thus be avoided.

By monitoring the property or state of the plant, process or process medium, overshoot of the running process can also be prevented. Such overshoot can occur, for example, due to a nonlinear response of the process to the partial stroke test. While methods for preventing overshoot of the valve member due to caking or crusting are described in the prior art to prevent damage to the valve or disturbance of the process or plant beyond the predetermined extent, the proposed method can be used to directly link the execution of the partial stroke test to the response of the process and to monitor compliance with the predetermined disturbance level. The test can be controlled or regulated accordingly, e.g., executed more slowly or with appropriate countermeasures. Partial stroke tests (first and/or second) can be carried out more safely in this way and thus usually more frequently.

Furthermore, information from other sensors (which do not necessarily monitor the state of the plant, the process or the process medium, such as position or torque sensors) or information about positioners or valves can be included. In this case, the method can be executed in such a way that a predetermined maximum stroke or breakaway torque is not exceeded.

By monitoring the process with the aid of one of the sensors and thus dynamically adjusting the stroke range, it is usually possible to exclude the possibility of the process being disturbed beyond the intended or predetermined extent. However, there are situations in which the process is disturbed more than intended. Such situations can arise due to feedback effects or spontaneous or unforeseen disturbances (e.g. due to a power failure). In these cases, the first or second partial stroke test can be (automatically) aborted if at least one of the sensors detects that the process is disturbed more than the specified extent. In this way, ongoing operation can be maintained even in such situations.

For this purpose, abort criteria can be defined, e.g., to prevent too much interference with the medium, the process and/or the plant. Also in these cases, corresponding upper or lower bounds or tolerance values or bands can be defined for the state or property of the plant, the process and/or the process medium monitored by the at least one sensor. Thus, a safety distance must usually be maintained from a predetermined minimum flow value or minimum pressure.

Following an abort, a message may be generated indicating that an abort criterion has been met or that the first or second partial stroke test has been aborted. The message can include further details, e.g. the reasons for the abort, the at least one measured value of at least one of the sensors or the measured disturbance, the stroke that was reached before the abort, or under which general conditions the abort occurred. This applies in particular to cases where a minimum stroke, e.g. the first stroke, could not be reached. In these cases, the partial stroke test is not only considered as aborted, but also as not performed or not passed.

If a partial stroke test cannot be performed for a longer period of time and the operability of the safety valves cannot be verified, a message can also be generated to inform the operator of the plant. The operator can then take appropriate action.

In addition to the condition or property of the plant, the process and/or the process medium, the positioner itself can also be monitored. For example, it can be configured in such a way that a predefined maximum stroke or the force with which the valve member is moved (e.g. the maximum applied torque for rotary valves) is not exceeded.

The method is based on at least one measured value detected by at least one sensor. The at least one measured value may represent a flow rate and/or flow velocity, a filling level, a temperature, a pressure, a density, a pH value and/or a position. The position may be, for example, the position of a controller or a valve member, for example, in a control valve of the plant. The flow rate may refer to the flow rate of the process medium, but may also comprise coolants and other fluids of the plant. The same applies to the measured temperature or density, the measured pressure, pH value or filling level.

With the help of process sensors (flow sensors, differential pressure sensors, temperature sensors, etc.) it is possible to draw conclusions about the state or a property of the process. This applies both to the state or a property of the entire plant as well as to the state or a property of the process or the process medium in the vicinity of or within the safety valves. The process sensors can be directly linked to the positioner of the safety valve. The sensors may already be present or available in the plant or may be installed specifically to perform the proposed method.

The state or property that can be derived from the at least one measured value describes, for example, the amount of medium that is in the valve or in the inlet upstream and/or in the outlet downstream, and/or the velocity, temperature, density, pressure or pH value of the medium. Considering the thus obtained state or property, it can be determined whether the valve can be moved during a partial stroke test without disturbing the process beyond the intended or predetermined extent.

The associated sensor is usually placed in the inlet or outlet or inside the safety valve. There, it monitors the state or a property of the plant and/or the process and/or the process medium. However, it can also be located in another part of the plant. In many cases, a sensor located inside or in the vicinity of the safety valve allows more reliable statements to be made about the extent to which a partial stroke test of the safety valve affects the plant, the process or the process medium. In addition, the change in the state or property measured or monitored by the sensor can be detected more quickly.

Many plants have double or redundant structures to increase the capacity or operational safety of the plant. Accordingly, a plant with a safety valve may have another safety valve with an inlet and an outlet, often installed in a comparable position of the plant, e.g. in a parallel line, where it has the same or at least a similar function. At least one of the sensors for monitoring the state or a property of the plant and/or the process and/or the process medium may be placed in the inlet or outlet or within the further safety valve. In such cases, the second partial stroke test is appropriate whenever the sensor or a reading taken by the sensor indicates that the additional structure is functioning or operating within normal parameters. Duplicate or redundant structures can be used in this way to safeguard the verification of the operability of a safety valve.

Additional sensors can provide supplemental information, wherein one sensor can be established or defined as the primary sensor. A partial stroke test can be set to the values of the primary sensor, meaning, for example, that an abort criterion is coupled to the measured values of the primary sensor. The remaining sensors can be used to make predictions about the disturbance to the process expected from the test, or in what ranges the state or property of the plant, process, and/or process medium might vary by the expected disturbance.

The safety (related to the disturbance of the process) of tests according to the invention can be increased by networking different sensors or positioners, either among each other or by a higher-level control system. In this way, current process states or valve positions can be exchanged. If the installation location or the position of the safety valves within the plant is taken into account, fluctuations in the pipelines can be detected at an early stage and taken into account when starting a partial stroke test. In an emergency, a partial stroke test could also be aborted. This also applies to situations where the process develops in an unexpected way.

The time at which the second partial stroke test can be performed can be determined actively or passively. A passive determination does not influence the running process or the state of the plant, but monitors with the help of the at least one sensor whether the second partial stroke test can be performed based on the state and/or property of the plant, the process and/or process medium. In the case of an active determination, the system is controlled in such a way that the second partial stroke test can be performed at a predetermined time.

An active determination can, for example, be made with the aid of double or redundant structures which can be switched at the predetermined time at which the second partial stroke test is carried out until the end of the test in such a way that a disturbance caused by the test of one of the safety valves can be compensated for by the other safety valve. For this purpose, it may be sufficient that the doubled or redundant structure is not available for a partial stroke test for the duration of the test or is switched or blocked accordingly.

By means of an active determination, the verification of the operability of the safety valve can be decoupled from the operation or state of the plant or the type of process running and be actively controlled. The verification can thus be carried out, for example, at predetermined intervals or on the basis of maintenance or time schedules.

In many cases it is useful to monitor the frequency of execution of partial stroke tests. If, for example, no partial stroke test is performed within a predetermined period of time, an error or warning message can be set or issued as part of the method.

Depending on the application, the predetermined period of time can be one day, one week, one month, two months or one year. The corresponding error or warning message can contain information about the measured values detected by the at least one sensor or the position of the valve member. It can also provide information on whether a time at which the second partial stroke test can be performed could be determined at all. This enables the user to analyze the reasons why a partial stroke test could not be performed and to initiate appropriate countermeasures.

Monitoring can be done with the help of records of whether and/or at what times partial stroke tests were performed and under what conditions. Such records can also be made independently of monitoring or the output of error messages. They enable the user to keep records of the verification of the operability of the safety valve or to detect impending malfunctions at an early stage and to initiate appropriate countermeasures.

A method according to the disclosure can also comprise the following steps. First, not only is the point in time determined at which the second partial stroke test can be carried out, but further starting conditions for the second partial stroke test and at least one abort criterion are also specified. The further start conditions are checked before the second partial stroke test is performed. If the further start conditions are not fulfilled, the second partial stroke test is not performed and the determination of the time at which the second partial stroke test can be performed and the checking of the further start conditions are repeated. If a time at which the second partial stroke test can be performed has been determined and the further start conditions are fulfilled, the second partial stroke test is started at the determined time. During the second partial stroke test, the movement of the valve member and the state or property of the plant and/or the process and/or the process medium are continuously monitored. The second partial stroke test is aborted as soon as at least one of the abort criteria is met. The test is registered as a successful second partial stroke test if the valve member has reached a stroke greater than the first stroke, and as a successful first partial stroke test if the valve member has reached a stroke equal to the first stroke. The test is registered as unsuccessful if the valve member has reached a stroke that is smaller than the first stroke. The method is now run again or continued with the checking of the further start conditions.

The further start conditions can include, for example, checking the connections and links required for the method. This includes checking the further start condition that the at least one sensor, e.g. a flow or differential pressure sensor, is linked or connected to the positioner or can transmit at least the at least one measured value to the positioner, either directly or indirectly via a data processing device. Furthermore, it can be checked whether the second partial stroke test should be performed at all, e.g., due to a predetermined maximum frequency for performing tests, i.e., it can be checked whether sufficient time has elapsed since the last partial stroke test. Furthermore, it can be checked whether the first or minimal stroke can be reached, i.e. whether the first partial stroke test can be performed. If the first partial stroke test can be performed but not the second, the first partial stroke test is performed.

In addition, records of already performed partial stroke tests can be analyzed and evaluated to ensure that all settings or specifications made can be fulfilled. In this way, information gained from previous tests can be used. In this context, for example, the breakaway torque is an important parameter. It can change over time (e.g. due to corrosion) and can be determined during a partial stroke test. If the last determined breakaway torque or even changes therein are recorded, exceeding the maximum permissible stroke by applying excessive forces when the valve member breaks away can be prevented. If the breakaway torque changes, conclusions can also be drawn about the maintenance requirements of the safety valve. If the last recorded breakaway torque is too high, a partial stroke test may no longer be performed safely. In this case, checking the additional start condition "breakaway torque" results in no further partial stroke test being performed without an external intervention or reset. If the algorithm cannot perform a test according to the configuration for a longer period of time defined by the user, the user is informed accordingly by a message. The start conditions mentioned are applicable to all methods according to the disclosure. The same applies to the abort criteria mentioned above.

The problem is further solved in that in a method according to the disclosure, as described above, the method steps are formulated as program code with which the method can run on at least one computer.

Furthermore, the problem is solved by a computer program which contains executable instructions which, when executed on a computing unit, a microcontroller, DSP, FPGA or computer or on a plurality thereof in a network, executes the method according to the disclosure in one of its embodiments.

Furthermore, the problem is solved by a computer program with program code means for carrying out the method according to the disclosure in one of its embodiments, when the program is executed on a computing unit, a microcontroller, DSP, FPGA or computer or on a plurality thereof in a network. In particular, the program code means may be instructions stored on a computer-readable medium.

Furthermore, the problem is solved by a data carrier on which a data structure is stored which, after being loaded into a working and/or main memory of a computing unit, a microcontroller, DSP, FPGA or computer or a plurality thereof in a network, can execute the method according to the disclosure in one of its embodiments.

Also, the problem is solved by a computer program product having program code means stored on a machine-readable medium for carrying out the method according to the disclosure in one of its embodiments when the program is executed on a computing unit, a microcontroller, DSP, FPGA or computer or on a plurality thereof in a network. In this context, a computer program product is understood to mean the program as a tradable product. In principle, it can be in any form, for example on paper or a computer-readable data carrier, and can in particular be distributed via a data transmission network.

Finally, the problem is solved by a modulated data carrier signal, which contains instructions executable by a computing unit, a microcontroller, DSP, FPGA or computer or by a plurality thereof in a network for carrying out the method according to the disclosure in one of its embodiments.

A computer system for executing the method may be a single computer or microcontrollers, DSPs or FPGAs, as well as a network of microcontrollers, DSPs, FPGAs or computers, for example an in-house closed network, or computers interconnected via the Internet. Furthermore, the computer system may be implemented by a client-server constellation, with parts of the disclosure running on the server and others running on a client.

Furthermore, the problem is solved by a positioner, which is part of a safety valve and is configured in such a way that it can verify the operability of the safety valve by means of the method according to the disclosure in one of its embodiments.

A solution to the problem is also provided by a safety valve, which is configured in such a way, that it can perform the method according to the disclosure in one of its embodiments.

The problem is also solved by a process plant with a safety valve, the plant being configured in such a way that it can verify the operability of the safety valve by means of the method according to the disclosure in one of its embodiments.

Further details and features result from the following description of preferred embodiments in combination with the figures. Herein, the respective features can be realized on their own or several in combination with each other. The possibilities for solving the problem are not limited to the embodiments. For example, range specifications always include all—not mentioned—intermediate values and all conceivable subintervals.

BRIEF DESCRIPTION OF THE DRAWINGS

The embodiments are shown schematically in the figures. Identical reference numerals in the individual figures designate identical or functionally identical elements or elements corresponding to each other with regard to their functions. Individually.

DETAILED DESCRIPTION

Figure 1:
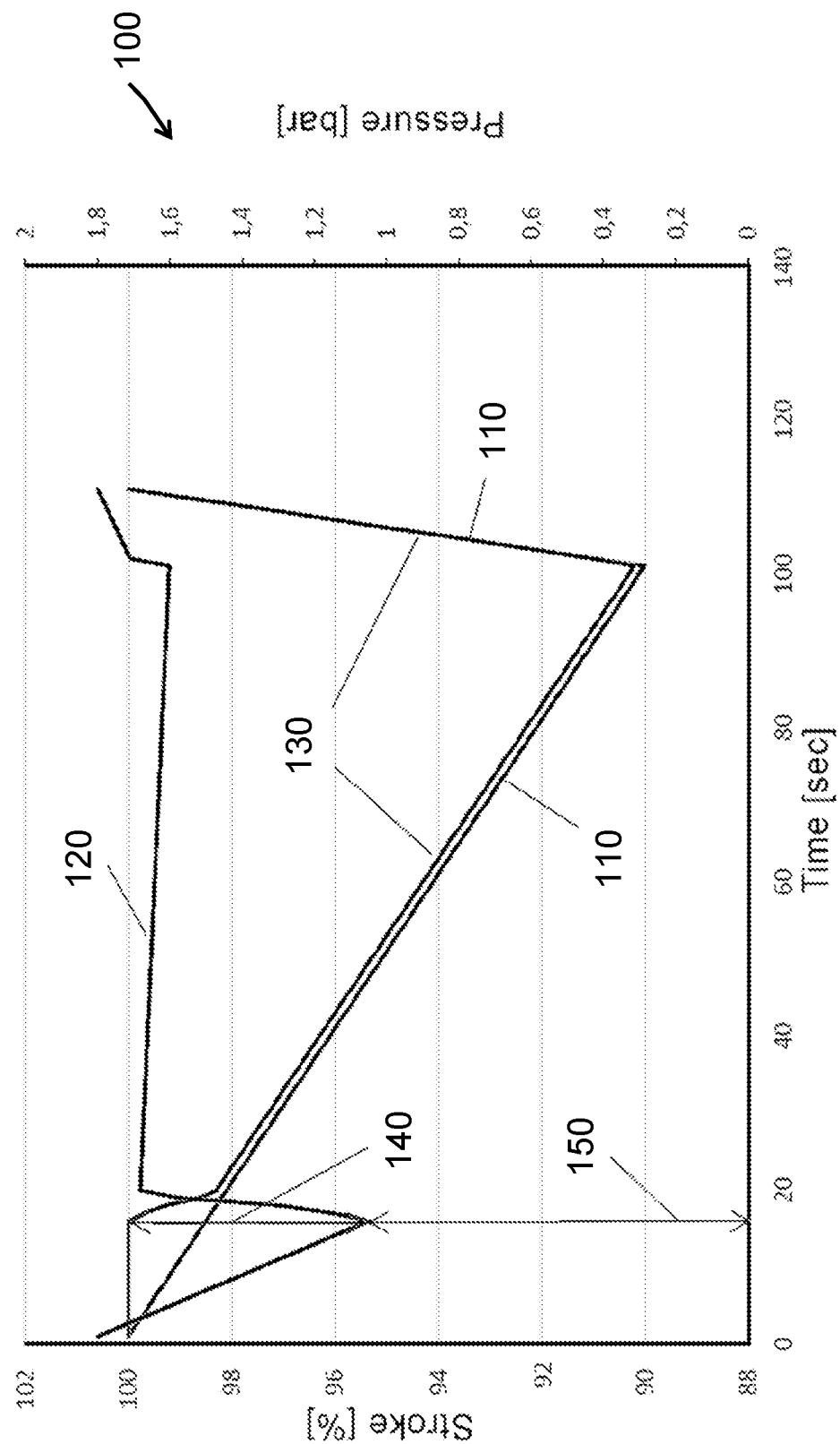
FIG. 1 shows a stroke-time curve and the associated pressure-time curve during a partial stroke test on a typical safety valve.
Figure 2:
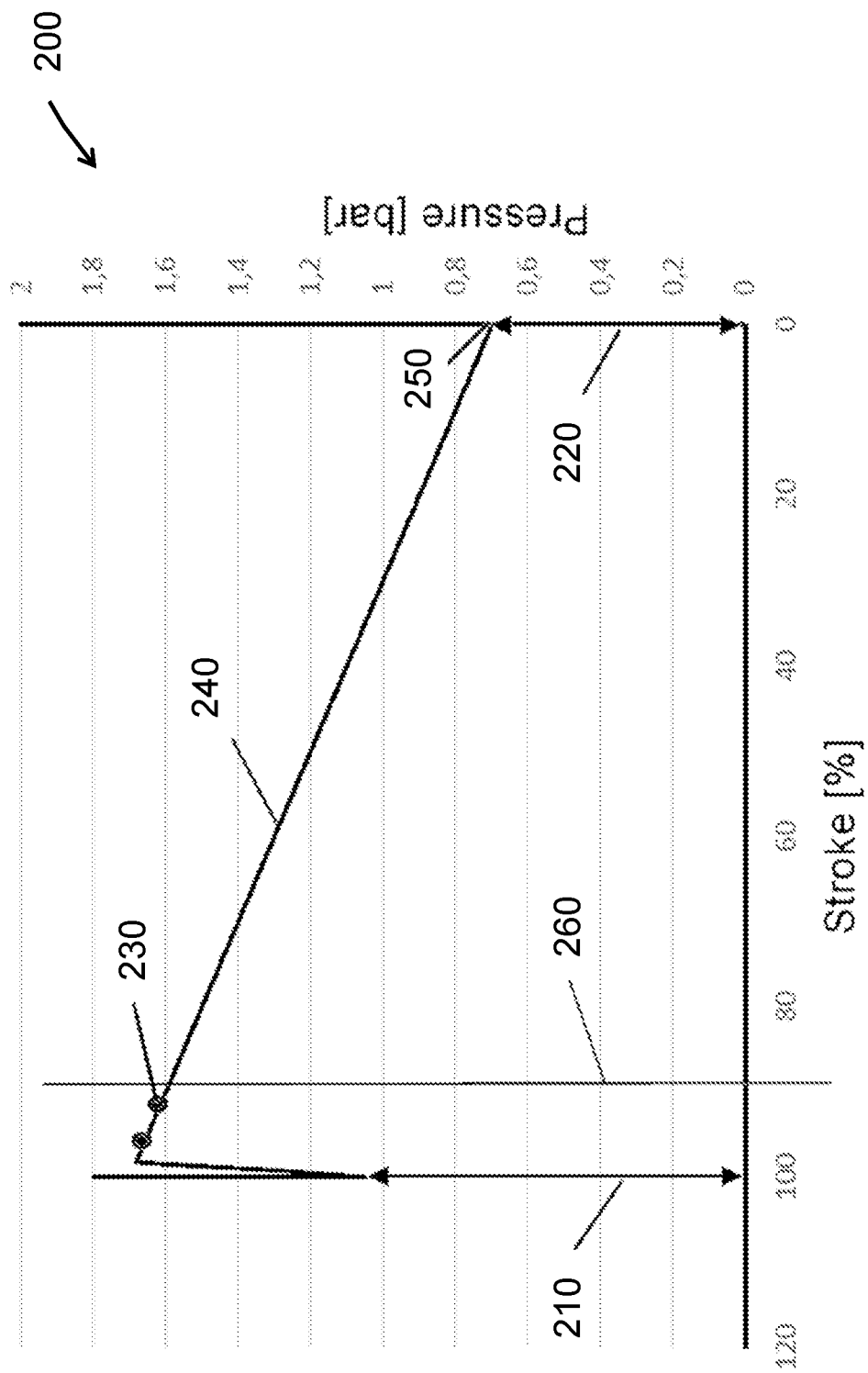
FIG. 2 shows a corresponding stroke-pressure curve.
Figure 3:
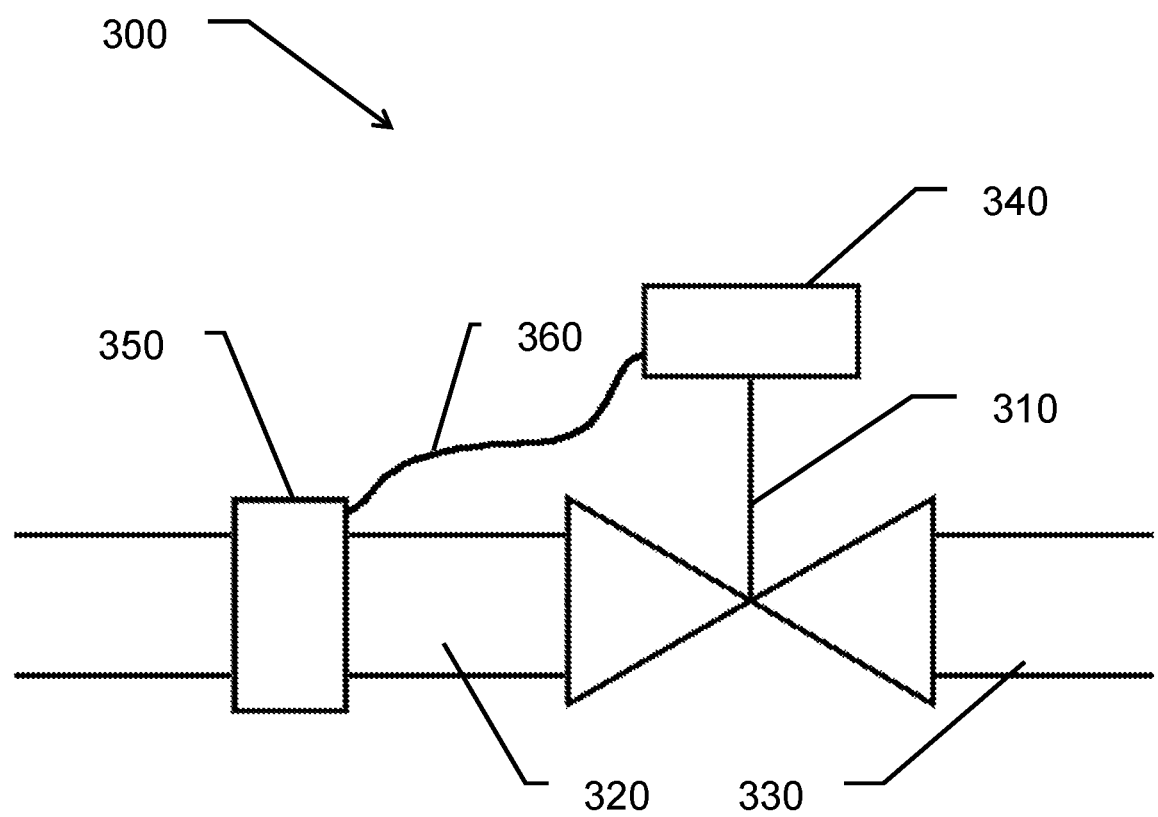
FIG. 3 shows a section of a process plant with a safety valve and a sensor upstream of the valve.

FIG. 3 shows a section 300 of a process plant with a safety valve 310. During operation of the plant, a fluid process medium can be passed through the section 300 or the valve 310. For this purpose, the valve 310 has an inlet 320 and an outlet 330, the process medium being fed into the safety valve 310 via the inlet 320 and being led out of the safety valve 310 again via the outlet 330. The flow of the medium is controlled by means of a valve member (not explicitly shown) and a positioner 340, which can move the valve member for this purpose. During operation, the valve member is in a position that obstructs the flow of the process medium through the valve 310 as little as possible or almost not at all. In the event of a fault, the safety valve 310 is closed with the aid of the positioner 340, i.e. the valve member is moved by the positioner 340 to a closed position so that the process medium can no longer pass through the valve 310.

The section 300 also has a sensor 350 disposed in the inlet 320 of the valve 310, i.e., the sensor 350 is upstream of the safety valve 310. In this example, the sensor 350 is a flow sensor that senses the flow rate of the process fluid based on the volumetric flow rate. It transmits its readings to the positioner 340 via the data line 360.

The positioner 340 is configured to verify that the safety valve 310 is functioning properly. To do so, it can perform both a first partial stroke test and a second partial stroke test. The first test comprises a first stroke, preferably 10% of the stroke from the open position to the closed position of the valve 310, which has been fixed by the user.

The second partial stroke test comprises a second stroke that can be dynamically adapted to the process running on the plant with the aid of the sensor 350. For this purpose, a time at which the second partial stroke test can be carried out is first determined on the basis of at least one measured value of the sensor 350, which is transmitted to the positioner 340 via the data line 360. In addition, further start conditions are checked, including whether the predetermined time interval between two partial stroke tests has already elapsed. The latter prevents the second partial stroke test from being performed too frequently.

The second partial stroke test can be performed, for example, at times when the sensor 350 transmits measured values to the positioner 340 indicating that the flow rate of the process medium has fallen below a certain level, e.g. 50% of the maximum possible flow rate ($D_0=D_{max}/2$). In this case, the positioner 340 can safely move the valve member of the safety valve 310 part of the stroke from the open to the closed position, since the flow of the process medium through the safety valve 310 is restricted by the running process anyway.

In this example, the flow rate D is directly proportional to the stroke h. In addition, the flow rate must not fall below a minimum flow rate $D_{min}$ of 25% of the maximum flow rate $D_{max}$ ($D_{min}=D_{max}/4$), with a safety margin of 10% to the minimum flow rate $D_{min}$. The maximum available stroke $h_{max}$ for the second partial stroke test is thus given by $$h_{max}=1-(D_{min}/D_0)(1+x)=1-((D_{max}/4)/(D_{max}/2))(1+10\%)=1-(2/4)(1+0,1)=45\%.$$

The second partial stroke test is carried out at the specified time. The sensor 350 is used to monitor that the flow disturbance specified when determining the time is adhered to. With the aid of the sensor 350, the maximum stroke can also be continuously redetermined during the test and adapted to the current measured values or the current flow rate. In turn, the maximum stroke can be calculated, for example, from the current flow rate $D_0$ and a specified safety margin of, for example, 10% to a minimum flow rate $D_{min}$. If the upstream sensor 350 e.g. reports a currently increasing or decreasing flow, the maximum stroke can be adjusted to this flow.

Accordingly, the second partial stroke test can be dynamically adjusted to the current flow. Furthermore, process information from other sensors or information about other positioners or valves can be included. The method can be executed in such a way that a predefined maximum stroke is not exceeded. A torque sensor can be used to guarantee compliance with this and/or the other parameters (e.g. the breakaway torque, which would lead to large overshoots).

If the flow exceeds a certain value, a situation may arise in which the flow through the safety valve 310 must not be further restricted by the partial stroke test just being performed. In this case, the positioner 340 aborts the test. The stroke reached is recorded and further evaluated. If a stroke was reached that is greater than the first stroke, the second partial stroke test was successfully performed. If the first or minimum stroke was reached, the test is evaluated as if the first partial stroke test had been performed. If the minimum stroke is not reached, the test is considered as not executed. In this case, a corresponding error message is output.

With the aid of the sensor 350, the executed partial stroke test cannot only be monitored, but also safeguarded against unintentional or unforeseen disturbances of the running process. Accordingly, the method performed by the positioner according to the disclosure can be carried out more frequently, in particular without a detailed check of the process parameters, individual decisions or individual assessments of the current state of the entire plant.

In other embodiments, the sensor 350 may also measure the flow rate, pressure, temperature, pH or density of the medium. The use of a level sensor is also conceivable.

Figure 4:
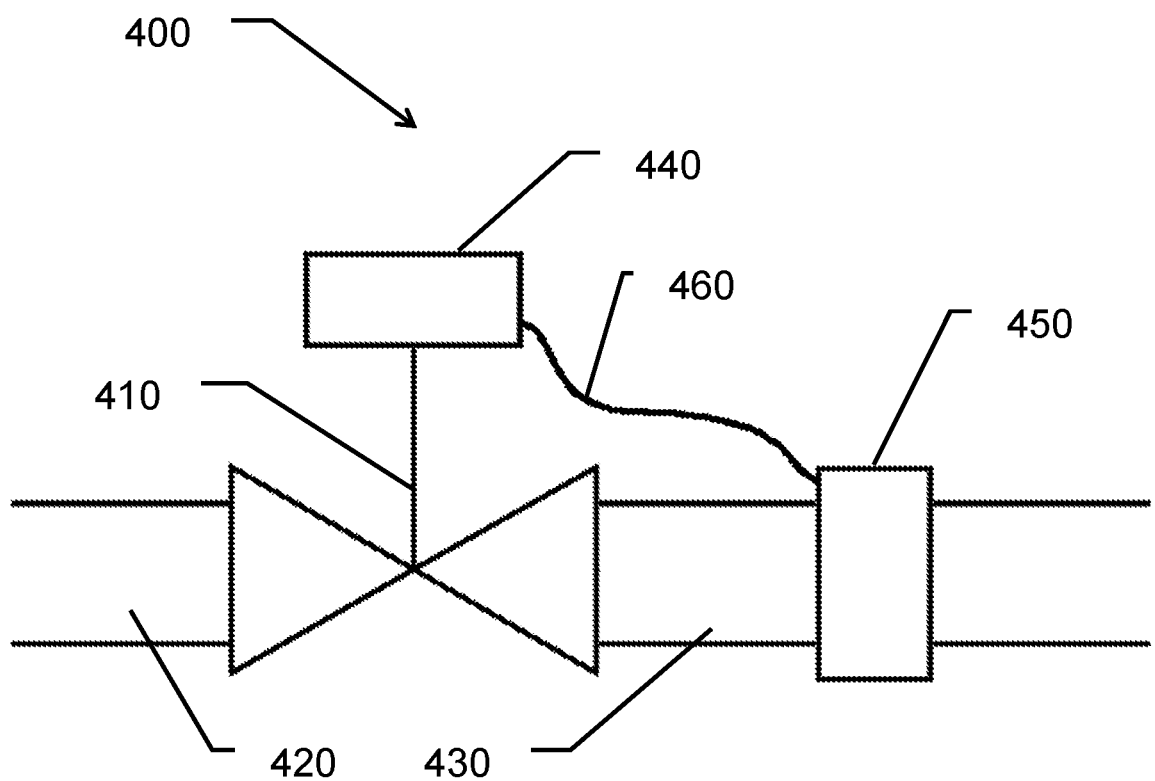
FIG. 4 shows a section of a process plant having a safety valve and a sensor downstream of the valve.

FIG. 4 shows a section 400 of a process plant with a safety valve 410 and a sensor 450 arranged in the outlet 430 of the safety valve, i.e. the sensor 450 is arranged downstream of the safety valve 410 in the section 400. The downstream sensor 450 may also be a sensor for determining the flow rate, flow velocity, temperature, pH, or density of the process medium. In principle, the operability of the safety valve 410 in the section 400 can be tested using the same methods as for the operability of the valve 310 in the section 300, the only difference being the point at which the measured values are taken to determine the time for a partial stroke test or to monitor the ongoing process. Accordingly, the monitoring of the disturbance of the process by the second/first partial stroke test can be done at the point that is most relevant for the running process. Thus, delays in monitoring and dynamically adjusting the partial stroke test due to the inertia of the process or plant can be avoided or reduced.

Figure 5:
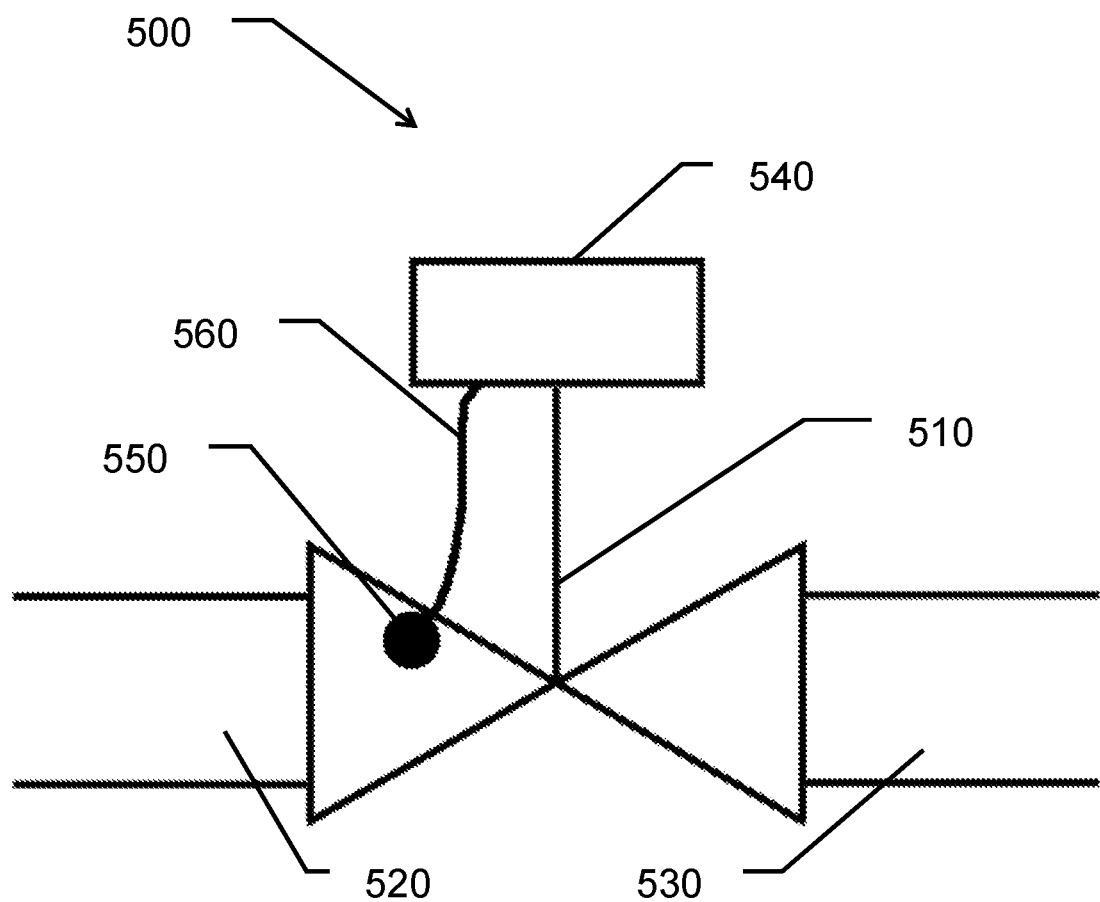
FIG. 5 shows a section of a process plant with a safety valve that has an integrated sensor.

FIG. 5 shows a section 500 of a process plant with a safety valve 510 and an integrated sensor 550. Apart from the sensor 550, the valve 510 is identical to the safety valve 310. The sensor 550 measures the pressure of the process medium in the valve 510. It is also linked via a data line 560 to a positioner 540 of the valve 510. The positioner 540 can use the sensor 550 to verify the operability of the valve 510 using one of the proposed methods. Accordingly, the methods can be performed not only with external sensors, but also with integrated sensors.

Figure 6:
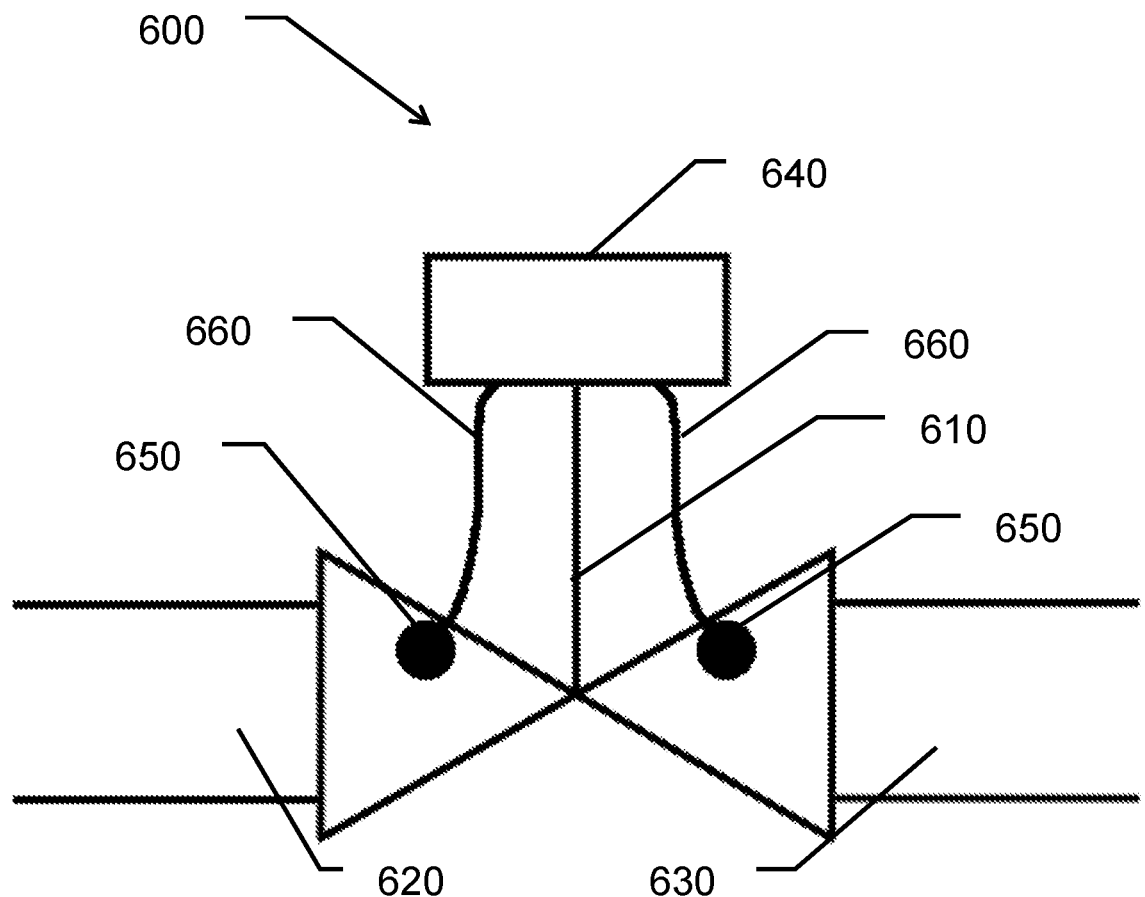
FIG. 6 shows a section of a process plant with a safety valve that has two integrated sensors.

FIG. 6 shows a section 600 of a process plant with a safety valve 610 comprising two integrated sensors 650 and a positioner 640. Except for the integrated sensors 650, the valve 610 is identical to the safety valves 310, 410 and 510. Both sensors 650 are connected to the positioner 640 using data lines 660. In this example, the sensors 650 measure the pressure of the process medium at two different points within the safety valve 610. In this way, a differential pressure measurement can be carried out which, for example, allows statements to be made about the pressure loss within the valve 610. In many cases, a high pressure loss indicates a disturbance of the flow of the process medium through the safety valve. If the disturbance is caused by a partial stroke test, the positioner 640 can either adjust the stroke range accordingly or even abort the test if necessary. This represents another alternative for performing the second partial stroke test according to one of the methods according to the disclosure.

Figure 7:
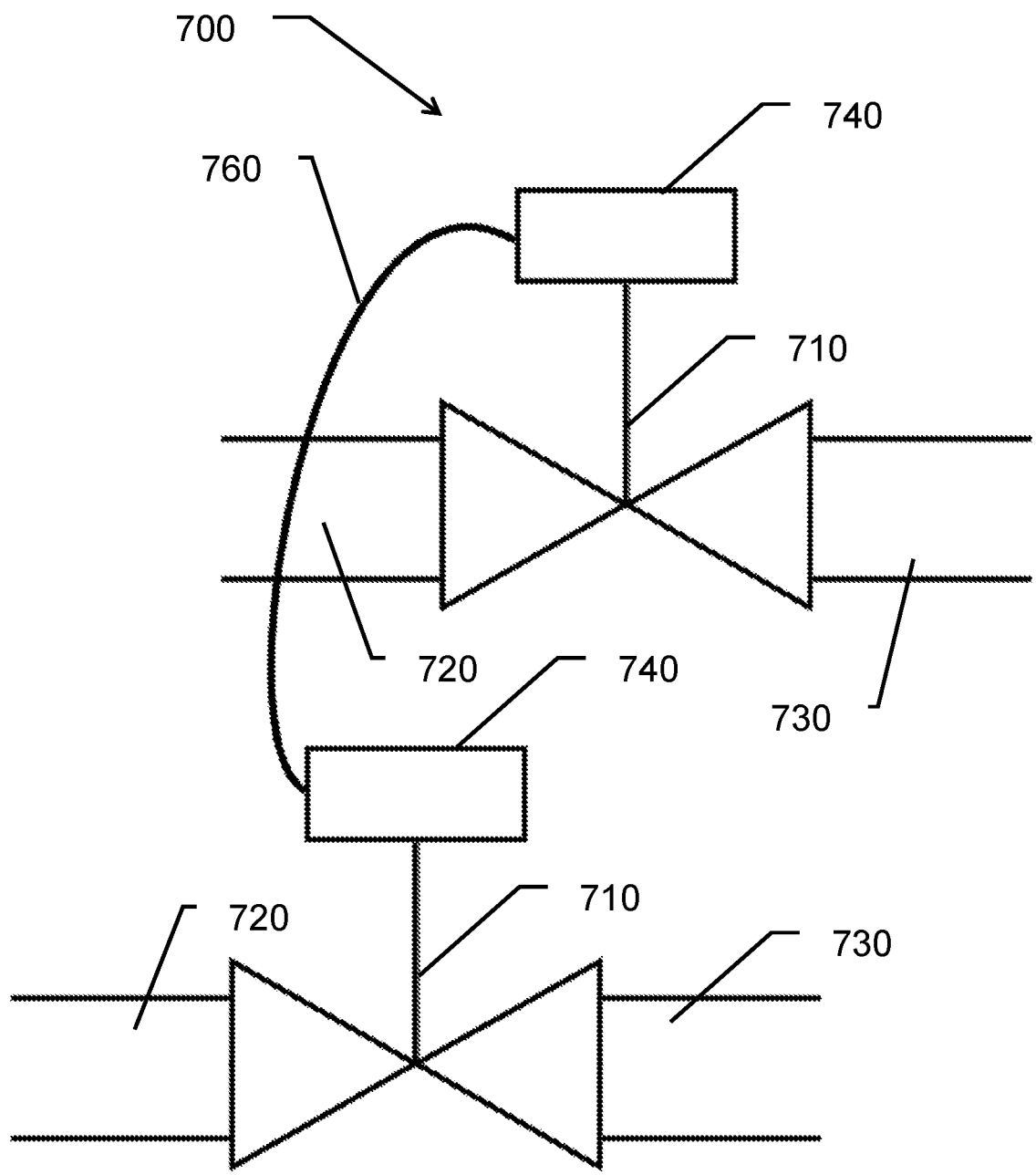
FIG. 7 shows a schematic diagram of a double structure with safety valves.

FIG. 7 shows a section of a plant with a double structure comprising two safety valves 710 in parallel-connected lines. As in the previous examples, the valves 710 include positioners 740. The positioners 740 are interconnected via a data line 760. Via the data line, the positioners exchange information about the position of the valve members or the current status of the valves 710. This exchange includes, in particular, times at which the second partial stroke test can be performed. The positioners alternate so that during a partial stroke test on one safety valve, no partial stroke test can be started or executed on the other safety valve. Accordingly, the positioners 740 can also be understood as sensors for the respective other positioner 740. Finally, they monitor the state or a characteristic of the plant or a part of the plant, namely a safety valve 710.

In another embodiment, the positioners may exchange information with each other from built-in, upstream, or downstream sensors, for example, about the flow rate of process fluid through one of the inlets 720 or outlets 730. Accordingly, a sensor in one of the lines may provide information to a positioner in the other line that a particular flow rate is flowing through the one line. Thus, a partial stroke test can be performed on the other line at 100% stroke, for example, and vice versa.

The proposed methods are not limited to the shown sections of a plant, but can also be carried out on parts of a plant which are combinations of the variants shown in FIGS. 1 to 5 and/or comprise additions with further sensors at further positions, which furthermore need not be limited to the shown sections.

Figure 8:
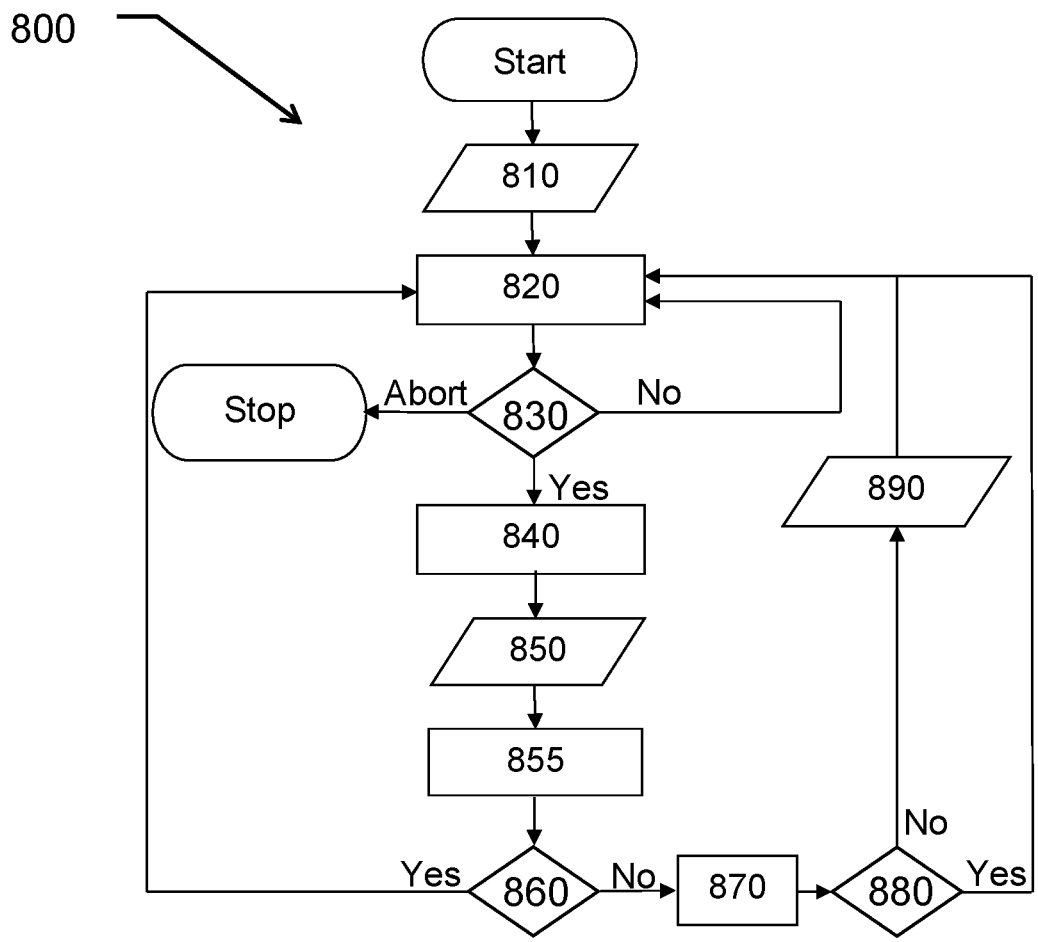
FIG. 8 shows a flow chart of a method for verifying the operability of a safety valve according to the disclosure.

FIG. 8 shows a flow chart of a preferred embodiment of a method according to the disclosure. The method begins with step 810, which specifies, among other things, the maximum extent to which the process may be disturbed. This specification represents an abort criterion for a partial stroke test, which is carried out as part of the method. In this embodiment, it is only aborted when the process is actually disturbed to the maximum extent specified. In addition, a first or minimum stroke is specified that must at least be achieved in order for the partial stroke test to be considered successful. Based on this specification, times can be determined in the further course of the method at which a partial stroke test with a larger stroke than the minimum stroke can be started or carried out. In addition, further start conditions are defined, such as the time period that should elapse between two partial stroke tests, and further abort criteria are defined in order to be able to automatically abort the partial stroke test.

Then, in step 820, it is checked whether the partial stroke test can be started. In addition to determining the time at which the partial stroke test is to be performed, the other start conditions are also checked.

In step 830, a decision is made on how to continue the method based on the results of the check. If no time could be determined at which the partial stroke test can be carried out, or if one of the further start conditions is not fulfilled, the method is continued with step 820. If a time could be determined at which the partial stroke test can be performed, and if all start conditions to be checked are fulfilled, the method continues with step 840. The method can also be aborted by the user at this point.

In step 840, the partial stroke test is started and executed at the specified time. During the execution, the movement of the valve member and the state or property of the plant and/or the process and/or the process medium are continuously monitored. The partial stroke test is aborted as soon as at least one abort criterion is met.

In step 850, the course of the partial stroke test is documented and output. In addition to the course of the test, the start conditions and abort criteria are also documented.

In step 855, it is checked whether the minimum stroke could be exceeded before the test was aborted.

In step 860, a decision is made on how to continue the method. If the at least one abort criterion was not met and the partial stroke test was not aborted before the minimum stroke was exceeded, the test was successful and the method is continued with step 820. If the at least one abort criterion was met and the second partial stroke test was aborted before the minimum stroke was exceeded, the method continues with step 870.

In step 870, it is checked whether at least the minimum stroke was achieved.

In step 880, the test in step 870 is used to decide how to continue the method. If the first stroke was achieved, the test is considered a successful first partial stroke test and the method is continued with step 820. If the first stroke was not reached, the test is registered as unsuccessful and the method continues with step 890.

In step 890, an error message is set to indicate to the user that no partial stroke test could be performed successfully. After setting the error message in step 890, step 820 is executed again next.

Glossary

Plant

A plant is a planned combination of technical components. The components can include machines, devices, apparatuses, storage units, lines or transport routes and/or control or regulating elements. They can be connected, interconnected and/or interlinked functionally and/or in a control- and/or safety-related manner.

Plants are operated in many different fields for a variety of purposes. These include, for example, method or process engineering plants, which in many cases can be attributed to the chemical industry. The term plants also includes refineries, district heating systems, geothermal or solar thermal plants, plants for food production, fresh water supply or waste water disposal, biogas plants, etc.

Flow Rate

Flow rate is the quantity of a fluid medium that moves through a given cross-section in a given unit of time. The quantity of the medium can be specified as a substance quantity. For metrological reasons, however, it is often specified in a unit of volume or mass.

Stroke

A stroke of a valve member refers to the distance that the valve member travels when it is moved from a first position to a second position.

Process

A (technical) process is the totality of operations in a (technical) plant. A running process is a process that is currently being run on a plant or in the normal operation of a plant. A process can be continuous (oil refining, district heating or power generation) or discontinuous (dough production for the production of baked goods, drug production, coffee roasting).

Process Medium

A process medium is a fluid medium that is circulated or transported within a plant as part of a process and may be changed in the process. Process media can be oils, salts, liquids or gases.

Positioner

A positioner is the element of a valve that actuates the valve member of the valve to open or close the valve. Positioners in many cases include an electric actuator or a fluidic actuator, the latter of which can be operated either hydraulically or with compressed air.

Valve Member

A valve member is that element of a valve which can release or close the valve seat and is actuated, for example, by a positioner to close or open the valve.

State of a Plant, a Process or a Process Medium

A state of a plant, process or process medium is defined by one or more instantaneous properties of the plant, process or process medium. The state of a process medium can be described by one or more properties of the medium such as temperature, pressure, density, pH, flow velocity, etc. The state of a process includes the properties of all process media involved in the process, the end products as well as other properties that characterize, for example, the individual technical processes and their relationship to each other. The latter include, for example, properties relating to the control of the process, e.g. with the aid of a valve or valve element. The state of a plant includes the properties of the process media in the plant, the processes that may be running on the plant, and other properties that may be independent of the processes or media. The latter include the design or age of the technical components, but also mechanical loads on the technical components caused by processes running on the plant.

REFERENCE NUMERALS 100 stroke-time curve and the associated pressure-time curve
110 setpoint of stroke
120 actual value of pressure
130 actual value of stroke
140 breakaway pressure
150 reserve of breakaway pressure
200 stroke-pressure curve
210 breakaway pressure reserve
220 closing pressure reserve
230 two points for determining the interpolation line
240 straight interpolation line
250 pressure value at stroke=0
260 90% of stroke, end of PST
300 section of a plant
310 safety valve
320 inlet
330 outlet
340 positioner
350 sensor
360 data line
400 section of a plant
410 safety valve
420 inlet
430 outlet
440 positioner
450 sensor
460 data line
500 section of a plant
510 safety valve
520 inlet
530 outlet
540 positioner
550 integrated sensor
560 data line
600 section of a plant
610 safety valve
620 inlet
630 outlet
640 positioner
650 integrated sensor
660 data line
700 section of a plant with a double structure
710 safety valve
720 inlet
730 outlet
740 positioner
760 data line
800 method for verifying the operability of a safety valve
810 specifications
820 checking the start conditions
830 start conditions fulfilled?
840 perform partial stroke test
850 document partial stroke test
855 checking the stroke achieved
860 was the minimum stroke exceeded?
870 checking the stroke achieved
880 was the minimum stroke reached?
890 output of an error message

The invention claimed is:

1. A method for verifying the operability of a safety valve, wherein the safety valve comprises a valve member and a positioner for controlling the position of the valve member, wherein the safety valve is part of a plant on which a process with a process medium runs,
wherein the plant comprises at least one sensor for monitoring a state or a property of at least one of the plant, the process, and the process medium,
wherein the method comprises a first partial stroke test and a second partial stroke test for verifying the operability of the safety valve,
wherein for the first partial stroke test a first stroke of the valve member is predetermined by the positioner,
wherein the method comprises the following steps:
monitoring the state and/or the property of the plant, the process and/or process medium by acquiring at least one measured value of the at least one sensor;
wherein at least one of the measured values represents at least one of a flow rate, a velocity, a filling level, a temperature, a pressure, a density, a pH value, and a position;
based on the at least one acquired measured value and the monitored state and/or property of the plant, the process and/or process medium, determining a point in time during the ongoing process at which the second partial stroke test may be performed;
wherein the second partial stroke test has a second stroke of the valve member by the positioner which is greater than the predetermined first stroke of the first partial stroke test and less than or equal to the stroke in a full stroke test;
wherein the second stroke is such that the second partial stroke test can disrupt the process to no more than a predetermined extent; and
wherein the second partial stroke test is performed at the point in time during the ongoing process at which the second partial stroke test may be performed that is determined based on the at least one acquired measured value and the monitored state and/or property of the plant, the process and/or process medium.

2. The method according to claim 1, further comprising:
during the execution of the first or second partial stroke test, monitoring the first or the second partial stroke test with the aid of at least one of the sensors to determine that the process is not disturbed more than to the predetermined extent.

3. The method according to claim 1, further comprising:
aborting the first or the second partial stroke test if the first or the second partial stroke test is detected by at least one of the sensors that the process is disturbed more than to the predetermined extent.

4. The method according to claim 1, wherein the safety valve has an inlet and an outlet,
wherein the at least one sensor is arranged in at least one of the inlet of the safety valve, the safety valve, and the outlet of the safety valve.

5. The method according to claim 1, wherein the system comprises a further safety valve; wherein the further safety valve has an inlet and an outlet,
wherein the at least one sensor is arranged in at least one of the inlet of the further safety valve, the further safety valve, and the outlet of the further safety valve.

6. The method according to claim 1, further comprising:
controlling the system such that the second partial stroke test can be performed at a predetermined time.

7. The method according to claim 1, further comprising:
if no partial stroke test is performed within a predetermined period of time, issuing an error or warning message.

8. The method according to claim 1, further comprising:
a) apart from the determined time at which the second partial stroke test can be carried out, specifying further starting conditions and at least one abort criterion for the second partial stroke test;
b) checking the further start conditions before the second partial stroke test is performed;
c) if the further start conditions are not fulfilled, not performing the second partial stroke test and repeating the determination of the time at which the second partial stroke test can be performed and the checking of the further start conditions;
d) if a time at which the second partial stroke test can be performed has been determined and the further start conditions are fulfilled, starting the second partial stroke test at the determined time;
e) during the second partial stroke test, continuously monitoring movement of the valve member and the state or property of at least one of the plant, the process, and the process medium,
f) aborting the second partial stroke test as soon as at least one of the abort criteria is met;
g) registering the second partial stroke test as a successful second partial stroke test if the valve member has reached a stroke which is greater than the first stroke;
h) registering the second partial stroke test as a successful first partial stroke test if the valve member has reached a stroke equal to the first stroke;
i) registering the second partial stroke test as unsuccessful if the valve member has reached a stroke that is less than the first stroke; and
j) continuing the method with step b.

9. The method according to claim 1, wherein the method steps are formulated as program code with which the method can run on at least one computer.

10. A non-transitory computer-readable medium having stored thereon program instructions that upon execution by a computing unit, microcontroller, DSP, FPGA or computer or on a plurality thereof in a network, cause performance of a set of steps according to the method of claim 1.

11. The non-transitory computer-readable medium according to claim 10, further comprising:
during the execution of the first or second partial stroke test, monitoring the first or the second partial stroke test with the aid of at least one of the sensors to determine that the process is not disturbed more than to the predetermined extent.

12. The non-transitory computer-readable medium according to claim 10, further comprising:
aborting the first or the second partial stroke test if the first or the second partial stroke test is detected by at least one of the sensors that the process is disturbed more than to the predetermined extent.

13. The non-transitory computer-readable medium according to claim 10, wherein at least one of the measured values represents at least one of a flow rate, a velocity, a filling level, a temperature, a pressure, a density, a pH value, and a position.

14. The non-transitory computer-readable medium according to claim 10, wherein the safety valve has an inlet and an outlet,
wherein the at least one sensor is arranged in at least one of the inlet of the safety valve, the safety valve, and the outlet of the safety valve.

15. The positioner of the safety valve according to claim 1,
wherein the positioner is configured to verify the operability of the safety valve via the method according to claim 1.

16. The safety valve with the positioner according to claim 1, wherein the safety valve is configured to perform the method according claim 1.

17. A process plant having the safety valve according to claim 1, wherein the plant is configured to verify the operability of the safety valve via a method according to claim 1.

* * * * *